(12) United States Patent
Dong et al.

(10) Patent No.: US 11,263,231 B2
(45) Date of Patent: Mar. 1, 2022

(54) DATA COPY METHOD AND DEVICE

(71) Applicant: Alibaba Group Holding Limited, Grand Cayman (KY)

(72) Inventors: Yuanyuan Dong, Hangzhou (CN); Li Xu, Hangzhou (CN); Weibin Yan, Hangzhou (CN); Puyuan Yang, Hangzhou (CN); Kai Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 388 days.

(21) Appl. No.: 15/809,910

(22) Filed: Nov. 10, 2017

(65) Prior Publication Data

US 2018/0089297 A1 Mar. 29, 2018

Related U.S. Application Data

(63) Continuation of application No. PCT/CN2016/079552, filed on Apr. 18, 2016.

(30) Foreign Application Priority Data

May 11, 2015 (CN) .......................... 201510236871.8

(51) Int. Cl.
*G06F 16/10* (2019.01)
*H04L 29/08* (2006.01)
(Continued)

(52) U.S. Cl.
CPC .......... *G06F 16/27* (2019.01); *G06F 16/2365* (2019.01); *G06F 16/951* (2019.01);
(Continued)

(58) Field of Classification Search
None
See application file for complete search history.

(56) References Cited

U.S. PATENT DOCUMENTS 6,578,054 B1 6/2003 Hopmann et al.
9,311,327 B1 * 4/2016 Xing ................... G06F 16/1815
(Continued)

FOREIGN PATENT DOCUMENTS

CN 102508835 6/2012
CN 102541461 7/2012
(Continued)

OTHER PUBLICATIONS

Translation of Notification to Grant Patent Right for Invention dated Feb. 2, 2019, from CN Patent Application No. 201510236871.8, 2 pages.
(Continued)

*Primary Examiner* — Kristopher Andersen
(74) *Attorney, Agent, or Firm* — Lee & Hayes, P.C.

(57) ABSTRACT

A data copy method comprises: acquiring, by a destination server, a data block identifier, version information and hole information; transmitting, by the destination server, the data block identifier, the version information and the hole information to a source terminal server so as to enable the source server to find corresponding data according to the data block identifier, the version information and the hole information; receiving, by the destination server, a response message carrying the data transmitted by the source server and copying the data to a hole corresponding to the data block identifier, the version information and the hole according to the response message.

20 Claims, 5 Drawing Sheets

(51) Int. Cl.
  *G06F 16/27*  (2019.01)
  *G06F 16/951*  (2019.01)
  *G06F 16/23*  (2019.01)
  *H04L 65/40*  (2022.01)
  *H04L 67/1095*  (2022.01)
  *H04L 67/1097*  (2022.01)
  *G06F 16/20*  (2019.01)
  *G06F 16/90*  (2019.01)
  *G06F 3/06*  (2006.01)
  *G06F 16/182*  (2019.01)

(52) U.S. Cl.
  CPC .......... *H04L 29/08* (2013.01); *H04L 67/1095* (2013.01); *H04L 67/1097* (2013.01); *G06F 3/067* (2013.01); *G06F 16/182* (2019.01)

(56) References Cited

U.S. PATENT DOCUMENTS

| | | | |
|---|---|---|---|
| 2003/0158869 | A1 | 8/2003 | Micka |
| 2010/0049718 | A1 | 2/2010 | Aronovich et al. |
| 2013/0332558 | A1* | 12/2013 | Condict ............... G06F 3/0641 709/214 |
| 2014/0095823 | A1* | 4/2014 | Shaikh ................ G06F 16/188 711/165 |
| 2014/0373147 | A1 | 12/2014 | Seinfeld et al. |

FOREIGN PATENT DOCUMENTS

| | | |
|---|---|---|
| CN | 103795754 | 5/2014 |
| JP | 2002116939 | 4/2002 |
| JP | 2004326162 | 11/2004 |
| WO | WO2010079713 | 7/2010 |

OTHER PUBLICATIONS

Translation of Office Action dated Feb. 23, 2018, from CN Patent Application No. 201510236871.8, 5 pages.
Translation of Office Action dated Jul. 18, 2017, from CN Patent Application No. 201510236871.8, 6 pages.
Translation of Search Report dated Jul. 5, 2017, from corresponding CN Patent Application No. 201510236871.8, 1 page.
Translation of Supplemental Search Report dated Aug. 13, 2018, from CN Patent Application No. 201510236871.8, 1 page.
The Extended Search Report dated Sep. 3, 2018, for PCT Application No. 16792018.0, 8 pages.
Translation of International Search Report from corresponding PCT application No. PCT/CN2016/079552 dated Jul. 11, 2016, 2 pages.
Translation of Written Opinion from corresponding PCT application No. PCT/CN2016/079552 dated Jul. 11, 2016, 5 pages.
English translated the Third Chinese Office Action dated Sep. 4, 2018, for Chinese Patent Application No. 201510236871.8, a counterpart foreign application of U.S. Appl. No. 15/809,910, 7 pages.
The Japanese Office Action dated Nov. 19, 2019 for Japanese Patent Application No. 2017-559062, a counterpart of U.S. Appl. No. 15/809,910, 7 pages.

* cited by examiner

DATA COPY METHOD AND DEVICE

CROSS REFERENCE TO RELATED PATENT APPLICATIONS

This application claims priority to and is a continuation of PCT Patent Application No. PCT/CN2016/079552, filed on Apr. 18, 2016, which claims priority to Chinese Patent Application No. 201510236871.8, filed on May 11, 2015, entitled "Data Copy Method and Device," which are hereby incorporated by reference in their entirety.

TECHNICAL FIELD

The present disclosure relates to the field of communications, and, more particularly, to a data copy method and device applicable at a distributed storage system.

BACKGROUND

In a distributed storage system, data block is stored with multiple copies. Each update of the data block needs consistency among the multiple copies. When there are fewer copies or some of the copies are short of the updated data for a certain version, data copy from other copies needs to be conducted.

Currently, the precondition of data copy under the conventional techniques is that: the source server or the destination server needs to be able to calculate the data increment or difference based on the version of the local data to be copied locally and the version of the data to be copied and maintained by the peer, and to obtain the data increment or difference from the peer.

With respect to the distributed storage system that supports random reading and writing, the conventional techniques push the data from the source server to the destination server. The source server needs to push the existing block data to the destination server, which increases the amount of copied data, especially when the data update speed is greater than the data copy speed, and may also cause that the data copy process cannot be completed during a preset data copy time.

The conventional techniques have the following problems:

With respect to the distributed storage system supporting random access, the conventional techniques have the following problems. The conventional techniques cannot directly calculate the data increment or difference based on the difference between version numbers, and can only conduct a full copy of the data, which increases the data volume to be copied and the copy time.

In addition, during the data copy, when data update is occurring at the source server, the source server sends the new data increment to the destination server or the destinations server requests the new data increment from the source server. When the copied data is updated again, such data needs to be copied again between the source server and destination server, thereby increasing the data volume for copying. In addition, when the data updating speed is faster than the copy speed between the source server and the destination server, the copy may not be completed in real time. To ensure the completion of data copy in real time, the updating speed needs to be reduced according to the copy speed, thereby reducing the data update performance.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a data copy method and device for realizing data copy in a distributed storage system supporting random access.

To achieve the above purpose, the present disclosure provides a data copy method, which includes at least the following steps:

The destination server obtains the data block identification, version information, and hole information.

The destination server sends the data block identification, version information, and hole information to the source server so that the source server may find the corresponding data according to the data block identification, version information, and hole information.

The destination server receives from the source server a response message that carries the data, and copies the data to the hole corresponding to the data block identification, version information, and the hole information according to the response message.

The present disclosure also provides a data update method, which is applicable to a distributed storage system supporting random access that includes source server and destination server.

The source server receives from the destination server the data block identification, version information, and hole information.

When determining that the current version number of the data block corresponding to the data block identification at the source server is larger than or equal to the version information, the source server determines the data corresponding to the data block identification, version information and hole information according to the data block identification, version information and hole information.

The source server sends to the destination server a response message that carries the data, so that the destination server copies the data to the hole corresponding to the data block identification, version information, and the hole information according to the response message.

The response message also includes the current version number of the data block corresponding to the data at the source server so that the destination server, when determining that the current version number of the data block at the destination server is larger than or equal to the current version number of the data block corresponding to the data at the source server, updates the current version number of the data block at the destination server as the latest version number of the data block.

For example, the hole information includes data offset position and data offset length.

Compared with the conventional techniques, the example embodiments of the present disclosure have the following advantageous technical effects:

In the example embodiment of the present disclosure, the destination server obtains the data block identification, version information, and hole information and sends the data block identification, version information, and hole information to the source server so that the source server searches for the corresponding data according to the data block identification, version information, and hole information, The destination server receives a response message, sent by the source server, that carries the data, and copies the data to the hole corresponding to the data block identification, version information, and the hole information according to the response message. Thus, the techniques of the present disclosure only copy data for the hole under the mode of random access, and there is no need to copy full data. The techniques of the present disclosure reduce the data copy volume and data copy time and improve the data copy efficiency.

BRIEF DESCRIPTION OF THE DRAWINGS

In order to more clearly illustrate the technical solutions in the embodiments or the conventional techniques of the present disclosure, the drawings for illustrating the embodiments are briefly introduced as follows. It is apparent that the FIGs only describe some of the embodiments of the present disclosure. One of ordinary skill in the art may obtain other figures according to the FIGs without using creative efforts.

DETAILED DESCRIPTION

Figure 1:
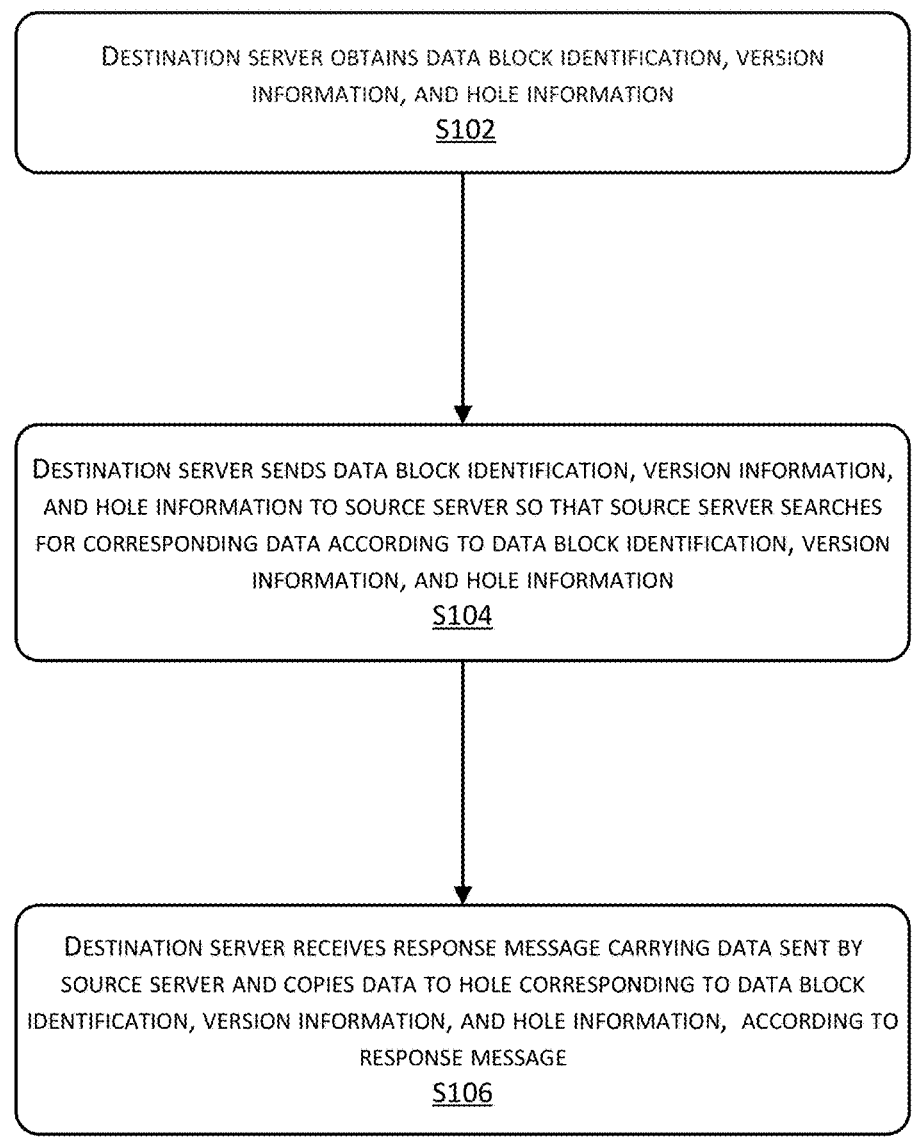
FIG. 1 is a flowchart of a data copy method according to an example embodiment of the present disclosure.

The technical solutions of the present disclosure will be described by referenced to the FIGs of the example embodiments of the present disclosure. Apparently, the example embodiments described herein represent some of the example embodiments instead of all embodiments of the present disclosure. Any other embodiment obtained by one of ordinary skill in the art without creative efforts based on the example embodiments of the present disclosure shall belong to the protection scope of the present disclosure.

To achieve the above purpose, the present disclosure provides a data copy method, which includes at least the following steps:

The destination server obtains the data block identification, version information, and hole information.

The destination server sends the data block identification, version information, and hole information to the source server so that the source server may find the corresponding data according to the data block identification, version information, and hole information.

The destination server receives from the source server a response message that carries the data, and copies the data to the hole corresponding to the data block identification, version information, and the hole information according to the response message.

The destination server obtains the data block identification, version information, and hole information, which includes:

The destination server obtains a data copy request. The data copy request includes the data block identification, version information, and hole information.

The data copy request also includes a data copy starting version number.

The version information includes a data copy ending version number.

After the destination server obtains the data block identification, version information, and hole information, the method also includes the following operations:

The destination server, after determining that the data copy ending version number of the data block corresponding to the data block identification is larger (or more updated) than the data copy starting version number of the data block corresponding to the data block identification and determining that the data copy starting version number of the data block corresponding to the data block identification is the same as the current version number of the data block corresponding to the data block identification at the destination server, performs the step to send the data block identification, the version information, and the hole information to the source server.

Here, if a first version number is larger than a second version number, it means that the first version number is more updated than the second version number.

The response message includes the current version number of the data block corresponding to the data at the source server.

When the destination server determines that the current version number of the data block at the destination server is larger than or equal to the current version number of the data block corresponding to the data at the source server, updates the current version number of the data block at the destination server as the latest version number of the data block.

After the destination server obtains the data block identification, version information, and hole information, the method also includes the following operations:

The destination server determines the hole to which the data is to be copied according to the data block identification, version information, and hole information, and merges overlapping holes into a new hole after finding another hole corresponding to another data copy request that overlaps the hole.

After copying the data to the hole corresponding to the hole information according to the response message, the method further includes:

The destination server deletes the data block identification, version information, and hole information.

For example, the hole information includes data offset position and data offset length.

The present disclosure also provides a data update method, which is applicable to a distributed storage system supporting random access that includes source server and destination server.

The source server receives from the destination server the data block identification, version information, and hole information.

When determining that the current version number of the data block corresponding to the data block identification at the source server is larger than or equal to the version information, the source server determines the data corresponding to the data block identification, version information and hole information according to the data block identification, version information and hole information.

The source server sends to the destination server a response message that caries the data, so that the destination server copies the data to the hole corresponding to the data block identification, version information, and the hole information according to the response message.

The response message also includes the current version number of the data block corresponding to the data at the source server so that the destination server, when determining that the current version number of the data block at the destination server is larger than or equal to the current version number of the data block corresponding to the data at the source server, updates the current version number of the data block at the destination server as the latest version number of the data block.

For example, the hole information includes data offset position and data offset length.

The present disclosure also provides a destination server, which is applicable to a distributed storage system supporting random access that includes source server and destination server. The destination server includes:

an obtaining module that obtains the data block identification, version information, and hole information;

a sending module that sends the data block identification, version information, and hole information to the source server so that the source server searches for the corresponding data according to the data block identification, version information, and hole information; and a copying module that receives from the source server a response message that carries the data, and copies the data to the data block corresponding to the data block identification according to the response message.

The obtaining module obtains a data copy request. The data copy request includes the data block identification, version information, and hole information.

The data copy request also includes a data copy starting version number.

The version information includes a data copy ending version number.

The sending module further, after determining that the data copy ending version number of the data block corresponding to the data block identification is larger than the data copy starting version number of the data block corresponding to the data block identification and determining that the data copy starting version number of the data block corresponding to the data block identification is the same as the current version number of the data block corresponding to the data block identification at the destination server, sends the data block identification, the version information, and the hole information to the source server.

The response message includes the current version number of the data block corresponding to the data at the source server.

The copying module, when determining that the current version number of the data block at the destination server is larger than or equal to the current version number of the data block corresponding to the data at the source server, updates the current version number of the data block at the destination server as the latest version number of the data block.

The destination server determines the hole to which the data is to be copied according to the data block identification, version information, and hole information, and merges overlapping holes into a new hole after finding another hole corresponding to another data copy request that overlaps the hole.

The destination server further deletes the data block identification, version information, and hole information.

For example, the hole information includes data offset position and data offset length.

The present disclosure also provides a source server, which is applicable to a distributed storage system supporting random access that includes source server and destination server. The source server includes:

a receiving module that receives from the destination server the data block identification, version information, and hole information;

an obtaining module, when determining that the current version number of the data block corresponding to the data block identification at the source server is larger than or equal to the version information, obtains the data corresponding to the data block identification, version information and hole information according to the data block identification, version information and hole information; and a sending module that sends to the destination server a response message that carries the data, so that the destination server copies the data to the hole corresponding to the data block identification, version information, and the hole information according to the response message.

The response message also includes the current version number of the data block corresponding to the data at the source server so that the destination server, when determining that the current version number of the data block at the destination server is larger than or equal to the current version number of the data block corresponding to the data at the source server, updates the current version number of the data block at the destination server as the latest version number of the data block.

For example, the hole information includes data offset position and data offset length.

In an example embodiment of the present disclosure, the data difference of the data block to be copied between the destination server and the source server is regarded as hole at the destination server, and index information of the holes is established. The hole information includes a data block offset position and a data block length. The index information includes the hole information and the version information. The index information includes the hole information and the version information. The destination server, according to the hole index information of the hole, reads the corresponding data from the source server and writes the corresponding data into the corresponding hole position at the local data block, and then clear the hole index information corresponding to the copied data. The destination server reads the data to be copied corresponding to all holes from the source server and writes them into the local data blocks, thereby completing the data copy process. During the data copy process, the data update operation, if any, is sent to the source server and the destination server simultaneously At the destination server, the update data that is more updated covers the hole whose current data version is lower than the update data, thereby reducing hole data volume and the data needs to be copied.

The techniques of the present disclosure establish the index information of the holes and only copy data corresponding to the hole information. After the data copy is completed for the hole information, the next update to the data block corresponding to the hole needs not be copied from the source server. The destination server may receive the data update operation the same time as the source server. Thus, the data volume of the data to be copied is reduced.

In addition, during the data copy process, the new data update request is sent to the source server and the destination server simultaneously. The update data with more updated version is coped to the hole whose data is at lower version. Thus, the hole data volume is reduced and the data needs to be copied is also reduced.

Further, the techniques of the present disclosure support data increment copy in the distributed storage system supporting random access and only copy the data increment.

An example data copy process is as follows:
1. A data copy initiation terminal sends a data copy imitation request to a destination server. The data copy imitation request includes a data block identification, a data copy starting version number, a data block current version number, a hole list, a destination server address. The hole list corresponds to all data difference of a data block from the data copy starting version number to the data block current version number. If the whole data block needs to be copied, the hole list is a list of hole that includes whose data block offset position is 0 and the data block length is the whole block length. The source server address includes a server address of a server that stores the current effective data copy of the data block.
2. The destination server receives the data copy imitation request and verifies that the data copy initiation request is valid, and establishes the hole index for the data block to be copied. The destination server then responds to the data copy initiation request. An example verification is to determine that the version of the data block stored at the destination server is the same as the data copy starting version number, and the current version number in the data copy request is larger or more updated than the data copy starting version number. If the destination server does not have the information of the data block, the hole in the data copy request includes the whole data block.
3. The destination server, according to the hole index information, sends a data copy request corresponding to the hole to the source server. The data copy request includes the data block identification, the data block offset position and length of the hole, and the version of the hole.
4. The source server, after receiving the data copy request sent by the destination server, verifies that the current version of the data block at the source server is larger than or equal to (which means at least as latest as) the version number corresponding to the hole in the data copy request, and then reads the corresponding data and sends a successful response message to the data copy request. If the source server cannot verify that the current version of the data block at the source server is larger than or equal to (which means at least as latest as) the version number corresponding to the hole in the data copy request, sends a failure response message corresponding to the data copy request. The successful response message includes the data block identification, the data offset position and length of the hole, the version number of the hole, the corresponding data, and the current version of the data block stored at the source server.
5. The destination server, after receiving the successful response message, writes the data corresponding to the hole into the local data block, deletes the corresponding index information of the hole, and saves the current version of the data block at the source server. If the source server still has index information of the hole, the operations at the above 3 are repeated. If all index information of holes for the data block are retrieved, the next step is performed.
6. The destination server determines that the current version number of the data block is larger than or equal to the current latest version of the data block at the source server, and updates the version number of the data block at the destination server as the latest version number of the data block.

The present disclosure also provides a method for updating data during the data copy process. The data update request includes the data block identification, data offset position of the data update, length of the data update, version number of the data update. During the data copy process, the data update request is sent to both the source server and the destination server simultaneously. The present disclosure does not limit the data update operation at the source server. During the data copy process, the example processing of the data update request by the destination server is as follows:

If the version number in the data update request is larger than the version number in the hole index information and there is an overlapping between the data interval in the data update request and the interval of the hole index information, the hole space with lower version number will be covered. The covered hole interval is deleted from the hole index information. The data update is directly written into the interval corresponding to the local data block. In some other scenario, the data update is merged with the data retrieved by the ongoing overlapping data. copy request and is then written into the interval corresponding to the data block.

FIG. 1 is a flowchart of a data copy method according to a first example embodiment of the present disclosure, which is applicable to a distributed storage system supporting random access including both a source server and a destination server. The following describes the data copy method from the perspective of the destination server.

The method includes the following operations:

S102, the destination server obtains the data block identification, version information, and hole information.

When initiating the data copy, the destination server obtains a data copy request initiated by a terminal for data copy initiation. The data copy request includes the data block identification, version information, hole information, and data block copy initiation version number. The version information includes the data copy ending version number.

After obtains the data block identification, version information, and hole information, the destination server determines whether the data copy ending version number of the data. block corresponding to the data block identification is larger than the data copy starting version number of the data block corresponding to the data block identification and whether the data copy starting version number of the data block corresponding to the data block identification is the same as the current version number of the data block corresponding to the data block identification at the destination server. It should be noted that, if the destination server does not have the information corresponding to the data block identification, the destination server is determined not to have the data block corresponding to the data block identification and the data block is copied in its entirety.

If a result of the determination is positive, the data block identification, the version number, and the hole information are valid and the following steps continue to be performed.

If a result of the determination is negative, the data block identification, the version number, and the hole information are invalid and will not be processes, or will be deleted.

Further, the hole information includes the data offset position and the data offset length. The destination server determines the hole to which the data is to be copied according to the data block identification, version information, and hole information, and merges overlapping holes into a new hole after finding another hole corresponding to another data copy request that overlaps the hole.

After obtaining the data copy request, the destination server determines the hole to which the data is to be copied according to the data block identification, version information, and hole information included in the data copy request. The destination server inquires whether there is a data copy request overlapping with the hole. That is, the destination server inquires whether there is another data copy request whose data block identification is the same as that in the data copy request, whose version number is smaller than the version number in the data copy request, and whose hole information's data offset position and data offset length overlaps with those of the hoe information in the data copy request. If there exists, the overlapping holes are integrated into one hole. That is, the overlapping data blocks with data block identifications that are identical, version information, and hole information are merged into one hole with the same data block identification, version information, and hold information. It should be noted that the version information of the merged hole is the version number corresponding to the version information of the latest data copy request.

Figure 2:
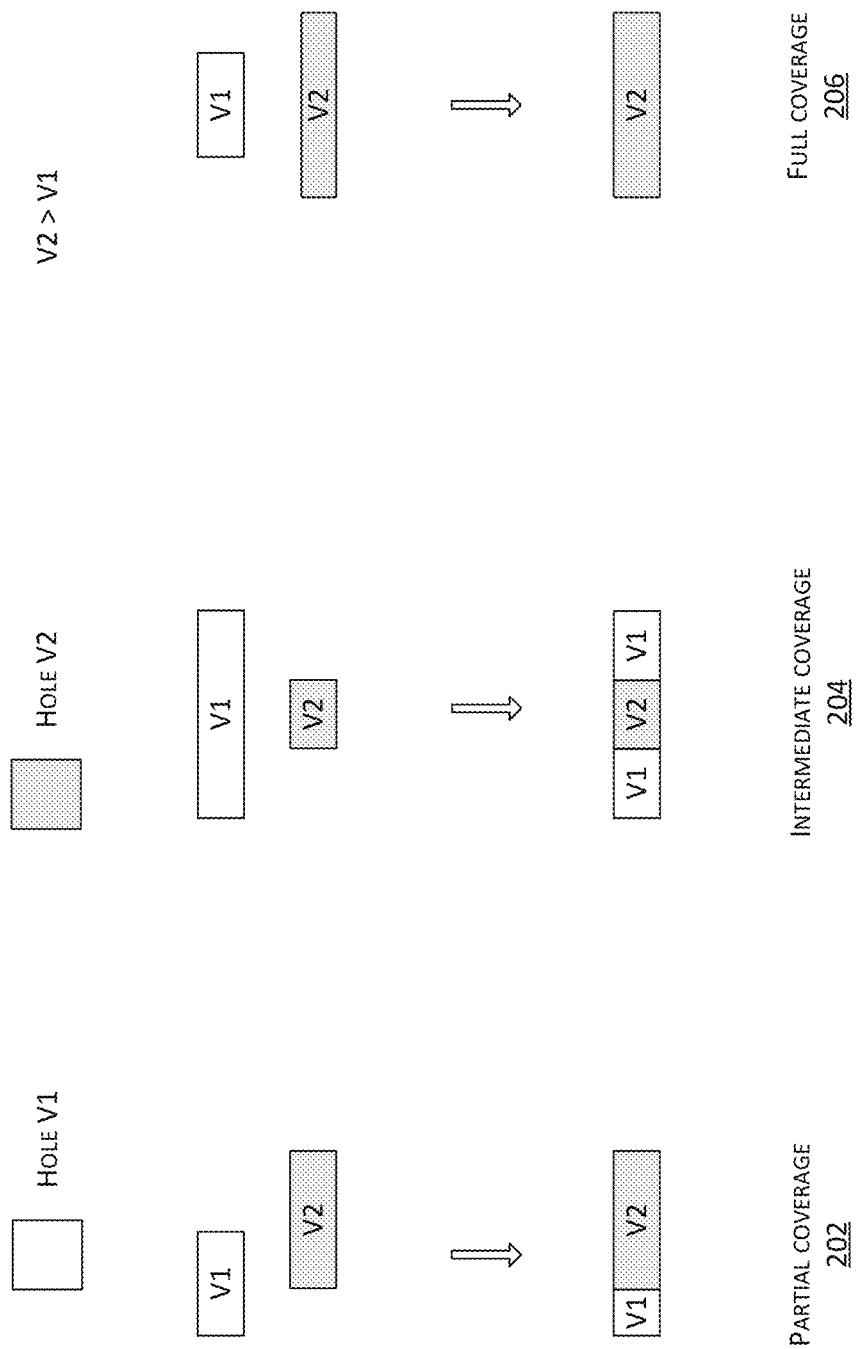
FIG. 2 is a diagram of integrating overlapping holes according to an example embodiment of the present disclosure.

For example, as shown in FIG. 2, the overlapping holes are merged into one hole, which includes: partial coverage 202, intermediate coverage 204, and full coverage 206. The hole to which the data is to be copied may be determined according to the data offset position and data. offset length. When the destination server obtains a hole V2 determined according to the data block identification 1, version information 16, and the corresponding hole information, and finds that there is a hole V1 determined according to the data block identification 1, version information, and corresponding hole information, and V2 and V1 overlap, V2 and V1 are integrated into one hole. The hole information corresponding to the merged hole is updated to the hole information corresponding to the hole V2. That is, the merged hole is updated to the hole requested in the newly received data copy request.

Specially, as shown in FIG. 2, as the hole corresponding to version information 16 is newer than the hole corresponding to version information 13, V2 and V1 are merged into one hole, i.e., V2 intersects V1, which includes the three merger methods as shown in FIG. 2.

S104, the destination server sends the data block identification, version information, and hole information to the source server so that the source server searches for the corresponding data according to the data block identification, version information, and hole information.

After the destination server sends to the source server the data block identification, version information, and hole information, the source server searches for data corresponding to the hole information under the version corresponding to the version information of the data block corresponding to the data black identification according to the data block identification, version information, and hole information.

S106, the destination server receives a response message, sent by a source server, that carries the data, and copies the data to the hole corresponding to the data block identification, version information, and the hole information according to the response message.

The destination server receives from the source server the response message that carries the data. The response message includes the data block identification, version information, hole information, and data. The destination server copies the data to the hole corresponding to the hole information according to the data block identification, version information, and hole information.

After the data is copied to the hole corresponding to the hole information according to the response message, the destination server deletes the data block identification, version information, and hole information.

The response message also includes the current version number of the data block corresponding to the data at the source server. The destination server, when determining that the current version number of the data block at the destination server is larger than or equal to the current version number of the data block corresponding to the data at the source server, updates the current version number of the data block at the destination server as the latest version number of the data block.

For example, the response message also includes the current version number of the data. block corresponding to the data at the source server. For example, if the current version number of the data block corresponding to the data at the source server is 17 and the current version number of the data block corresponding to the data at the destination server is 18, then the version number of the data block is 18 and this data copy process is completed. If the current version number of the data block corresponding to the data at the destination server is 16, after the data copy request is received and the request is determined to be valid, the data block identification, version information, and hole information included in the data copy request needs to be sent to the source server.

In the example embodiment of the present disclosure, the destination server obtains the data block identification, version information, and hole information and sends the data block identification, version information, and hole information to the source server so that the source server searches for the corresponding data according to the data block identification, version information, and hole information. The destination server receives a response message, sent by the source server, that carries the data, and copies the data to the hole corresponding to the data block identification, version information, and the hole information according to the response message. Thus, the techniques of the present disclosure only copy data for the hole under the mode of random access, and there is no need to copy full data. The techniques of the present disclosure reduce the data copy volume and data copy time and improve the data copy efficiency.

Figure 3:
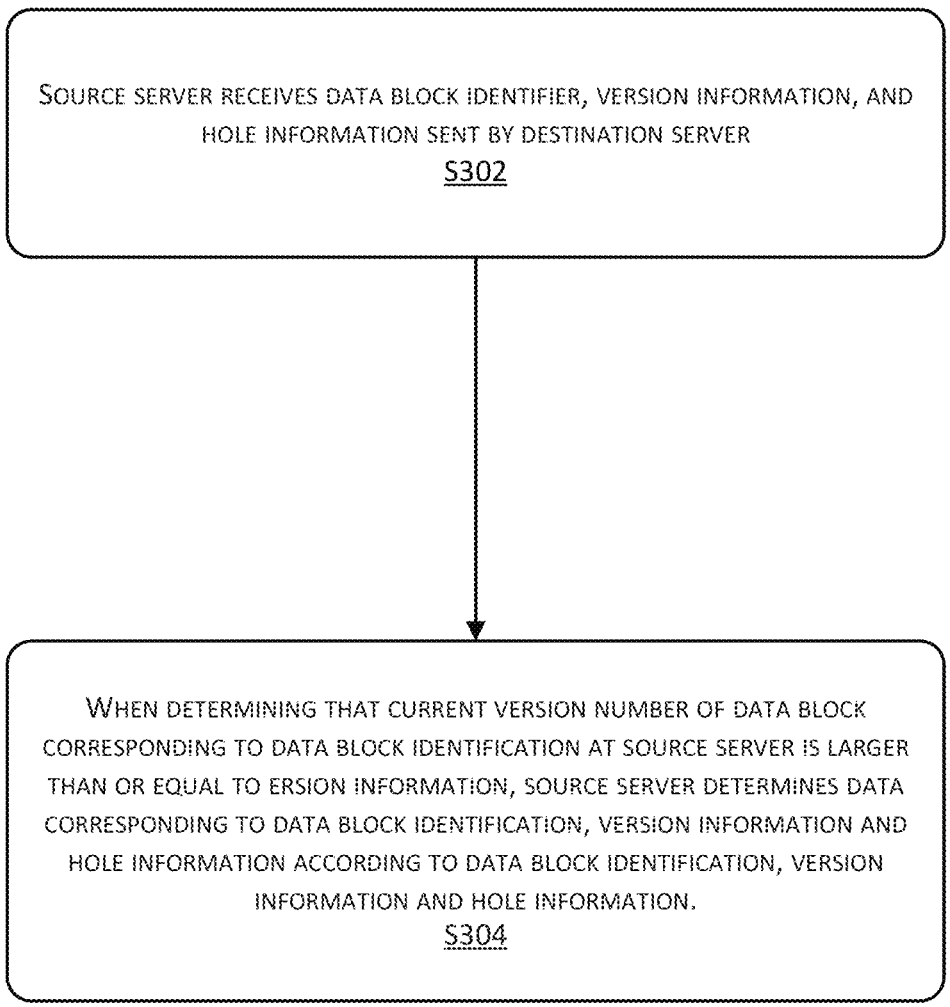
FIG. 3 is a flowchart of another data copy method according to an example embodiment of the present disclosure.

FIG. 3 is a flowchart of another data copy method according to a second example embodiment of the present disclosure, which is applicable to a distributed storage system supporting random access including both a source server and a destination server. The following describes the data copy method from the perspective of the source server.

The method includes the following steps:

S302, the source server receives the data block identifier, version information, and hole information that are sent by the destination server.

For example, the hole information includes data offset position and data offset length.

S304, when determining that the current version number of the data block corresponding to the data block identification at the source server is larger than or equal to the version information, the source server determines the data corresponding to the data block identification, version information and hole information according to the data block identification, version information and hole information.

The source server determines whether the current version number of the data block corresponding to the data block identification at the source server is larger than or equal to the version information. If a result of determination is positive, the source server searches for the data corresponding to the data block identification, version information, and hole information, and carries the data in the response message to be sent to the destination server. If a result of determination is negative, there is no data to be copied at the source server and a failure response message is sent to the destination server.

The response message also includes the current version number of the data block corresponding to the data at the source server. The destination server, when determining that the current version number of the data block at the destination server is larger than or equal to the current version number of the data block corresponding to the data at the source server, updates the current version number of the data block at the destination server as the latest version number of the data block.

In the example embodiment of the present disclosure, the destination server obtains the data block identification, version information, and hole information and sends the data block identification, version information, and hole information to the source server so that the source server searches for the corresponding data according to the data block identification, version information, and hole information. The destination server receives a response message, sent by the source server, that carries the data, and copies the data to the hole corresponding to the data block identification, version information, and the hole information according to the response message. Thus, the techniques of the present disclosure only copy data for the hole under the mode of random access, and there is no need to copy full data. The techniques of the present disclosure reduce the data copy volume and data copy time and improve the data copy efficiency.

Figure 4:
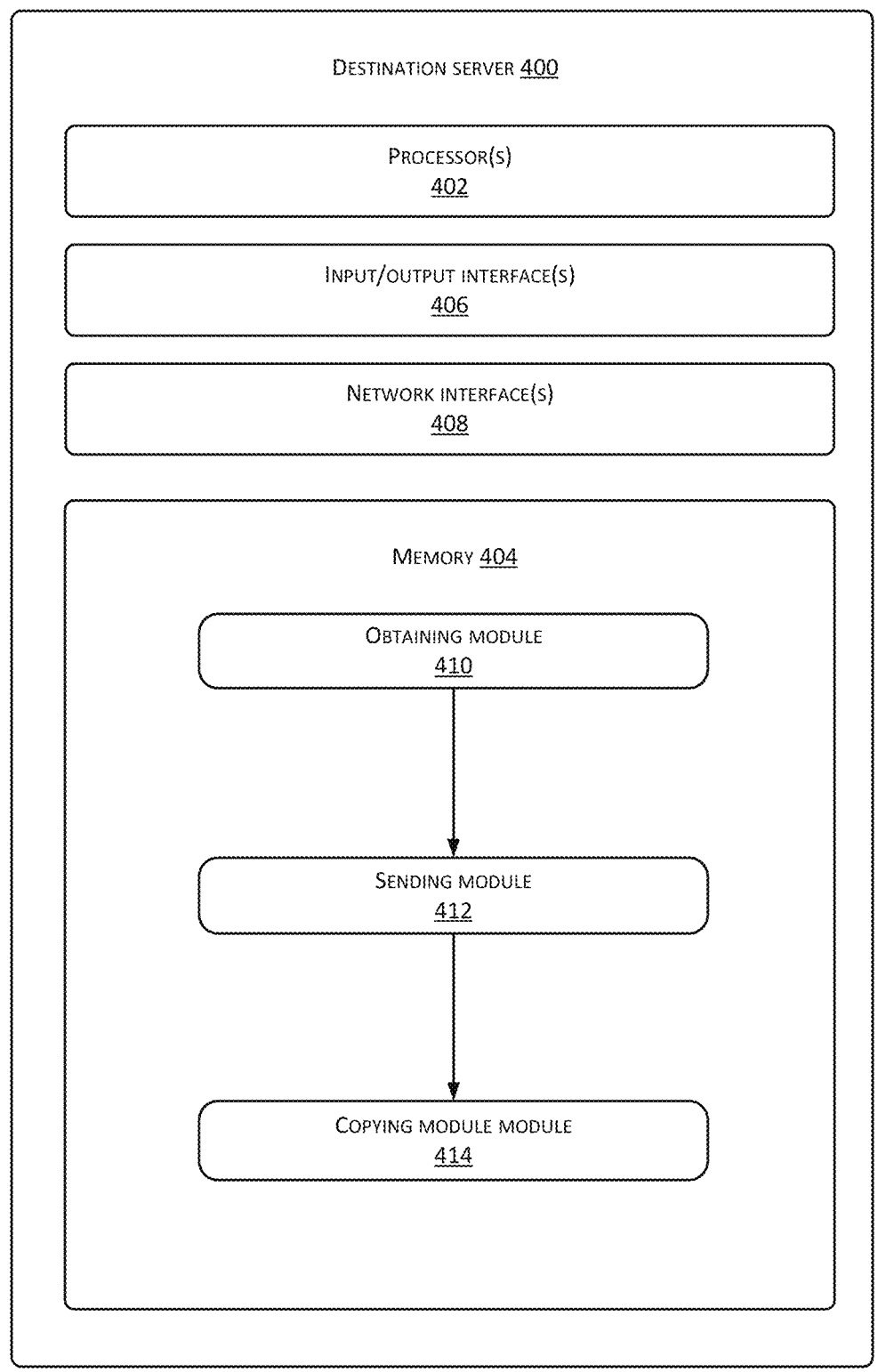
FIG. 4 is a diagram of a destination server according to an example embodiment of the present disclosure.

Based on the same principles in the first example embodiment, the present disclosure also provides a destination server according to a third example embodiment of the present disclosure, which is applicable to a distributed storage system supporting random access that includes source server and destination server. As shown in FIG. 4, a destination server 400 includes one or more processor(s) 402 or data processing unit(s) and memory 404. The destination server 400 may further include one or more input/output interface(s) 406 and one or more network interface(s) 408. The memory 404 is an example of computer readable media.

The computer readable media include non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable media do not include transitory media, such as modulated data signals and carriers.

The memory 404 may store therein a plurality of modules or units including:
  an obtaining module 410 that obtains the data block identification, version information, and hole information;
  a sending module 412 that sends the data block identification, version information, and hole information to the source server so that the source server searches for the corresponding data according to the data block identification, version information, and hole information; and
  a copying module 414 that receives from the source server a response message that carries the data, and copies the data to the data block corresponding to the data block identification according to the response message.

The obtaining module 410 obtains a data copy request. The data copy request includes the data block identification, version information The data copy request also includes a data copy starting version number.

For example, the version information includes a data copy ending version number.

The sending module 412 further, after determining that the data copy ending version number of the data block corresponding to the data block identification is larger than the data. copy starting version number of the data block corresponding to the data block identification and determining that the data copy starling version number of the data block corresponding to the data block identification is the same as the current version number of the data block corresponding to the data block identification at the destination server, sends the data block identification, the version information, and the hole information to the source server.

The response message also includes the current version number of the data block corresponding to the data at the source server.

The copying module 414, when determining that the current version number of the data block at the destination server is larger than or equal to the current version number of the data. block corresponding to the data at the source server, updates the current version number of the data block at the destination server as the latest version number of the data block.

The obtaining module 410 further determines the hole to which the data is to be copied according to the data block identification, version information, and hole information, and merges overlapping holes into a new hole after finding another hole corresponding to another data copy request that overlaps the hole.

The copying module 414 further deletes the data block identification, version information, and hole information.

For example, the hole information includes data offset position and data offset length.

In the example embodiment of the present disclosure, the destination server obtains the data block identification, version information, and hole information and sends the data block identification, version information, and hole information to the source server so that the source server searches for the corresponding data according to the data block identification, version information, and hole information. The destination server receives a response message, sent by the source server, that carries the data, and copies the data to the hole corresponding to the data block identification, version information, and the hole information according to the response message. Thus, the techniques of the present disclosure only copy data for the hole under the mode of random access, and there is no need to copy full data. The techniques of the present disclosure reduce the data copy volume and data copy time and improve the data copy efficiency.

Figure 5:
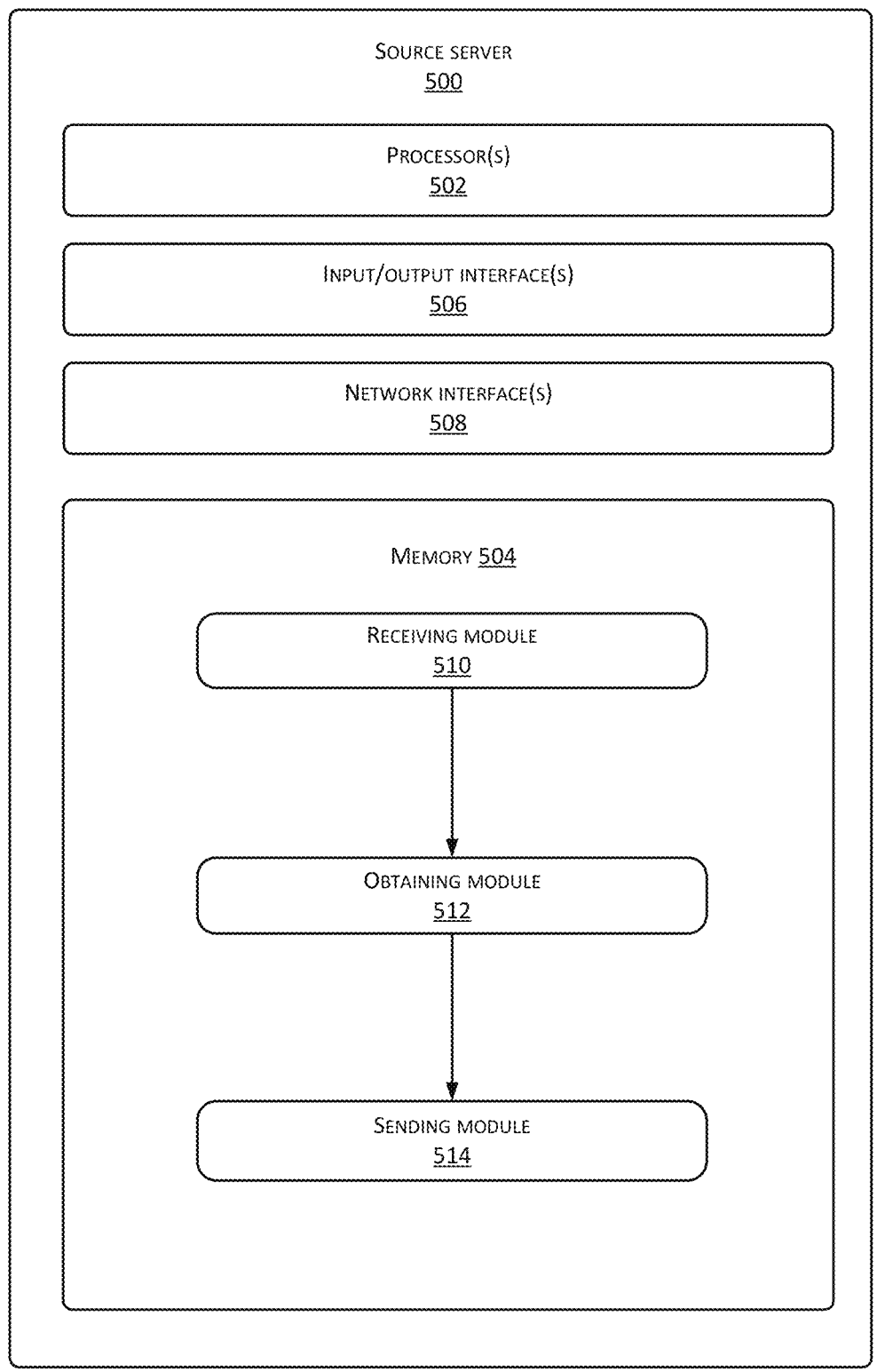
FIG. 5 is a diagram of a source server according to an example embodiment of the present disclosure.

Based on the same principles in the second example embodiment, the present disclosure also provides a destination server according to a third example embodiment of the present disclosure, which is applicable to a distributed storage system supporting random access that includes source server and destination server. As shown in FIG. 5, a source server 500 includes one or more processor(s) 502 or data processing unit(s) and memory 504. The source server 500 may further include one or more input/output interface(s) 506 and one or more network interface(s) 508. The memory 504 is an example of computer readable media.

The memory 504 may store therein a plurality of modules or units including:

- a receiving module 510 that receives from the destination server the data block identification, version information, and hole information;
- an obtaining module 512, when determining that the current version number of the data block corresponding to the data block identification at the source server is larger than or equal to the version information, obtains the data corresponding to the data block identification, version information and hole information according to the data block identification, version information and hole information.
- a sending module 514 that sends to the destination server a response message that carries the data, so that the destination server copies the data to the hole corresponding to the data block identification, version information, and the hole information according to the response message.

The response message also includes the current version number of the data block corresponding to the data at the source server so that the source server, when determining that the current version number of the data block at the destination server is larger than or equal to the current version number of the data block corresponding to the data at the source server, updates the current version number of the data block at the destination server as the latest version number of the data block. For example, the hole information includes data offset position and data offset length.

In the example embodiment of the present disclosure, the destination server obtains the data block identification, version information, and hole information and sends the data block identification, version information, and hole information to the source server so that the source server searches for the corresponding data according to the data block identification, version information, and hole information. The destination server receives a response message, sent by the source server, that carries the data, and copies the data to the hole corresponding to the data block identification, version information, and the hole information according to the response message. Thus, the techniques of the present disclosure only copy data for the hole under the mode of random access, and there is no need to copy full data. The techniques of the present disclosure reduce the data copy volume and data copy time and improve the data copy efficiency.

Based on the description of the above embodiments, it will be apparent to one of ordinary skill in the art that the present disclosure may be implemented by hardware, or by means of software plus the necessary general hardware platform. Based on this understanding, the technical solution of the present disclosure may be embodied in the form of a software product which may be stored in a nonvolatile storage medium (which may be a CD-ROM, a U disk, a mobile hard disk, etc.) which store computer-readable instructions that enable a computing device (such as a personal computer, a server, or a network device) to perform the methods described in the various implementation scenarios of the present disclosure.

It will be understood by one of ordinary skill in the art that the drawings are merely schematic diagrams of example embodiments and that the modules or processes in the drawings are not necessary to implement the present disclosure.

One of ordinary skill in the art will appreciate that the modules in the apparatus in the implementation scenario may be located at the apparatus distributed in the implementation scenario in accordance with the implementation scenario description, or may be modified correspondingly in one or more apparatuses different from the present implementation. The modules of the above scenario may be merged into one module, or further split into multiple sub-modules.

The above-mentioned serial numbers of the present disclosure are for the sake of description only and do not represent the merits of the implementation scenario.

The above descriptions are merely some example embodiments of the present disclosure. However, the present disclosure is not limited by the embodiments described herein. Any other changes that occur to one of ordinary skill in the art falls within the scope of the present disclosure.

What is claimed is:

1. A method comprising:
   obtaining, by a destination server, a data copy request, the data copy request including a data block identification, version information, and hole information, the hole information including a data offset position and a data offset length;
   determining a hole to which data is to be copied according to the data block identification, the version information, and the hole information included in the data copy request;
   determining that there is another hole corresponding to another data copy request overlapping with the hole at least according to the data offset position and the data offset length of the hole and a data offset position and a data offset length of the another hole;
   merging the another hole with the hole into a merged hole;
   sending a data block identification, version information, and hole information of the merged hole to a source server;
   receiving a response message, sent by the source server, that carries data according to the data block identification, the version information, and the hole information of the merged hole; and
   copying the data to the merged hole.

2. The method of claim 1, further comprising:
   requesting the source server to search for the data according to the data block identification, the version information, and the hole information of the merged hole.

3. The method of claim 1, wherein the data copy request further includes a data copy starting version number.

4. The method of claim 3, wherein:
   the version information includes a data copy ending version number.

5. The method of claim 4, further comprising:
   after obtaining the data block identification, the version information, and the hole information,
   determining, by the destination server, that the data copy ending version number of a data block corresponding to the data block identification is more updated than the data copy starting version number of the data block corresponding to the data block identification;
   determining that the data copy starting version number of the data block corresponding to the data block identification is same as a current version number of the data block corresponding to the data block identification at the destination server; and sending the data block identification, the version information, and the hole information to the source server.

6. The method of claim 5, wherein:
the response message further includes a current version number of the data block corresponding to the data at the source server.

7. The method of claim 6, further comprising:
determining, by the destination server, that the current version number of the data block at the destination server is at least as latest as the current version number of the data block corresponding to the data at the source server; and
updating the current version number of the data block at the destination server as a latest version number of the data block.

8. The method of claim 1, further comprises:
deleting, by the destination server, the data block identification, the version information, and the hole information after copying the data to the hole corresponding to the hole information according to the response message.

9. The method of claim 1, wherein the determining that there is the another hole corresponding to the another data copy request overlapping with the hole at least according to the data offset position and the data offset length of the hole and the data offset position and the data offset length of the another hole comprises:
determining that the data block identification of the another hole is the same as the data lock identification of the hole.

10. The method of claim 1, wherein the determining that there is the another hole corresponding to the another data copy request overlapping with the hole at least according to the data offset position and the data offset length of the hole and the data offset position and the data offset length of the another hole further comprises:
determining that a data version number corresponding to the version information of the another hole is smaller than a data version number corresponding to the version information of the hole.

11. The method of claim 1, wherein the version information of the merged hole is a version number corresponding to version information of a latest data copy request with a highest version number among obtained data copy requests.

12. A server comprising:
one or more processors; and
one or more memories stored thereon computer-readable instructions that, when executed by the one or more processors, cause the one or more processors to perform acts including:
obtaining a data copy request, the data copy request including a data block identification, version information, and hole information, the hole information including a data offset position and a data offset length;
determining a hole to which data is to be copied according to the data block identification, the version information, and the hole information included in the data copy request;
determining that there is another hole corresponding to another data copy request overlapping with the hole at least according to the data offset position and the data offset length of the hole and a data offset position and a data offset length of the another hole;
merging the another hole with the hole into a merged hole;
sending a data block identification, version information, and hole information of the merged hole to a source server;
receiving a response message, sent by the source server, that carries data according to the data block identification, the version information, and the hole information of the merged hole; and
copying the data to the merged hole.

13. The server of claim 12, wherein:
the data copy request further includes a data copy starting version number; and
the version information includes a data copy ending version number.

14. The server of claim 13, wherein the acts further comprise:
determining that the data copy ending version number of a data block corresponding to the data block identification is more updated than the data copy starting version number of the data block corresponding to the data block identification;
determining that the data copy starting version number of the data block corresponding to the data block identification is same as a current version number of the data block corresponding to the data block identification at the destination server; and
sending the data block identification, the version information, and the hole information to the source server.

15. The server of claim 12, wherein:
the response message further includes a current version number of the data block corresponding to the data at the source server; and
the acts further comprise:
determining that the current version number of the data block at a destination server is at least as latest as the current version number of the data block corresponding to the data at the source server; and
updating the current version number of the data block at the destination server as a latest version number of the data block.

16. The server of claim 12, wherein the determining that there is the another hole corresponding to the another data copy request overlapping with the hole at least according to the data offset position and the data offset length of the hole and the data offset position and the data offset length of the another hole comprises:
determining that the data block identification of the another hole is the same as the data lock identification of the hole; and
determining that a data version number corresponding to the version information of the another hole is smaller than a data version number corresponding to the version information of the hole.

17. The server of claim 12, wherein the version information of the merged hole is a version number corresponding to version information of a latest data copy request with a highest version number among obtained data copy requests.

18. One or more non-transitory memories stored thereon computer-readable instructions that, when executed by one or more processors, cause the one or more processors to perform acts including:
obtaining a data copy request, the data copy request including a data block identification, version information, and hole information, the hole information including a data offset position and a data offset length;

determining a hole to which data is to be copied according to the data block identification, the version information, and the hole information included in the data copy request;

determining that there is another hole corresponding to another data copy request overlapping with the hole at least according to the data offset position and the data offset length of the hole and a data offset position and a data offset length of the another hole;

merging the another hole with the hole into a merged hole;

sending a data block identification, version information, and hole information of the merged hole to a source server;

receiving a response message, sent by the source server, that carries data according to the data block identification, the version information, and the hole information of the merged hole; and copying the data to the merged hole.

19. The one or more non-transitory memories of claim 18, wherein the determining that there is the another hole corresponding to the another data copy request overlapping with the hole at least according to the data offset position and the data offset length of the hole and the data offset position and the data offset length of the another hole comprises:

determining that the data block identification of the another hole is the same as the data lock identification of the hole.

20. The one or more memories non-transitory of claim 18, wherein the version information of the merged hole is a version number corresponding to version information of a latest data copy request with a highest version number among obtained data copy requests.

\* \* \* \* \*